United States Patent
Liu et al.

(10) Patent No.: US 9,017,444 B2
(45) Date of Patent: Apr. 28, 2015

(54) COMPOSITE FOLIAGE SI FERTILIZER FOR LOWERING CONTENTS OF HEAVY METALS AND NITRATE IN VEGETABLE, AND PREPARATION METHOD THEREOF

(75) Inventors: Chuanping Liu, Guangdong (CN); Qing Li, Guangdong (CN); Fangbai Li, Guangdong (CN); Tongxu Liu, Guangdong (CN); Xianghua Xu, Guangdong (CN); Huimin Li, Guangdong (CN)

(73) Assignee: Guangdong Institute of Eco-Environment and Soil Sciences (CN)

( * ) Notice: Subject to any disclaimer, the term of this patent is extended or adjusted under 35 U.S.C. 154(b) by 260 days.

(21) Appl. No.: 13/500,988
(22) PCT Filed: Aug. 3, 2010
(86) PCT No.: PCT/CN2010/075656
§ 371 (c)(1),
(2), (4) Date: Apr. 9, 2012
(87) PCT Pub. No.: WO2011/134211
PCT Pub. Date: Nov. 3, 2011

(65) Prior Publication Data
US 2012/0198900 A1    Aug. 9, 2012

(30) Foreign Application Priority Data
Apr. 27, 2010 (CN) .......................... 2010 1 0156359

(51) Int. Cl.
C05D 9/00 (2006.01)
C05D 9/02 (2006.01)
C05G 3/00 (2006.01)

(52) U.S. Cl.
CPC .. C05D 9/02 (2013.01); C05D 9/00 (2013.01); C05G 3/0064 (2013.01)

(58) Field of Classification Search
CPC .... B01J 2523/68; B01J 23/28; B01J 23/8898; B01J 2523/3712; B01J 21/08; B01J 23/88; C01P 2002/50; C02D 9/02; C02G 3/00; C05D 9/00; C05D 9/02; C05G 3/0064
USPC ........................................................ 71/31–63
See application file for complete search history.

(56) References Cited

U.S. PATENT DOCUMENTS 3,983,029 A * 9/1976 White .......................... 208/59
4,725,572 A * 2/1988 Sera et al. ..................... 502/236

FOREIGN PATENT DOCUMENTS

CN    100469249 C    3/2009
CN    101696133 B    9/2011
(Continued)

OTHER PUBLICATIONS

Luo, et al., "Effect of Silicates on Cr, Pb Forms in Soil, Distribution in *Brassica chinensis* and Health Risk of *Brassica chinensis* under the Stress of Cr—Pb Pollution", Journal of Soil and Water Conservation, vol. 23, No. 6, Dec. 2009, (English translation of Abstract provided).
(Continued)

*Primary Examiner* — Jennifer A Smith
(74) *Attorney, Agent, or Firm* — Lerner, David, Littenberg, Krumholz & Mentlik, LLP (57) ABSTRACT

The present invention is related to the field of environmental protection, more specifically, to a foliage silicon fertilizer and a method for production of the fertilizer, which is a molybdenum-silica compound sol used for reducing heavy metal and nitrates in vegetables. The fertilizer, which is a molybdenum-silica compound sol, comprises 10-25 wt % silica, 0.05-5.5 wt % molybdenum ions. More preferably, the fertilize, which is a rare earth-molybdenum-silica compound sol, comprises 10-25 wt % silica, 0.05-5.5 wt % molybdenum ions and 0.1-7.5 wt % rare earth ions. By the combination of silica with molybdenum in the present invention, it is effective for preventing the absorption/accumulation of nitrates in vegetables. In addition, by the further combination with rare earth element, the prevention ability of the fertilizer from absorbing heavy metal and nitrates into vegetables is even enhanced. With a preparation method with normal pressure and relatively, low temperature, that is, with mild condition, simple process and high operability, large scale production of the present invention may be readily executed.

6 Claims, 4 Drawing Sheets

(56) References Cited

FOREIGN PATENT DOCUMENTS

| | | |
|---|---|---|
| KR | 20090098547 A | 9/2009 |
| WO | 2011134211 A1 | 11/2011 |

OTHER PUBLICATIONS

Wang et al., "Effects of Copper, Molybdenum, Silicon Nutrition on Balsam Pear (*Momordica charantia*) Yield and Quality in Two Vegetable Fields", Journal of Huazhong Agricultural University, vol. 26, No. 1, Feb. 2007, pp. 59-62 (English Abstract provided).

* cited by examiner

COMPOSITE FOLIAGE SI FERTILIZER FOR LOWERING CONTENTS OF HEAVY METALS AND NITRATE IN VEGETABLE, AND PREPARATION METHOD THEREOF

CROSS-REFERENCE TO RELATED APPLICATIONS

The present application is a national phase entry under 35 U.S.C. §371 of International Application No. PCT/CN2010/075656 filed Aug. 3, 2010, published in Chinese, which claims priority from Chinese Patent Application No. 201010156359.x, filed Apr. 27, 2010, all of which are incorporated herein by reference.

BACKGROUND OF THE INVENTION

1. Technical Field

The invention is related to environmental field, more specifically it is related to a fertilizer and method for preparation of it. This fertilizer is especially for reducing the content of heavy metal and nitrate in vegetables.

2. Description of Related Art

Vegetables are essential products for human being, and are directly related to their health. With the development of urbanization and industrialization, the soil pollution of vegetable lands, in particular those around cities, is getting worse and worse, which not only influences the yield and quality of vegetables, but also makes the agricultural product export limited by "Green Barriers". Further, this can be harmful to human through food chains. Within these pollutions, over-standards of heavy metals, nitrides and nitrites are the major problem.

Soil pollution by heavy metal in China is getting worse and is becoming a great threat to the human health. According to statistics, at present, China has nearly 0.15 billion acre of polluted soil which is more than 1/10 of the total agricultural lands, within which 32.5 million in polluted by sewage, 2 million is polluted by solid wastes. Most of these polluted areas are located in developed regions. Every year, the agricultural product decrease caused by soil pollution is up to 12 million tons, which directly leads more than 20 billion RMB of economic loss. Vegetables are not only important economic plants but also essential in people's daily life. Heavy metals could be concentrated in vegetables, and the concentrated metal could be led to human body by food chain, thus is harmful to human beings.

According to current researches which have aroused widely academic interests, by applying silicon fertilizers, the resistance of rice to manganese, iron, cadmium, aluminum and other heavy metals can be improved, thus the absorption and accumulation of those heavy metals in the vegetables can be reduced. However, if the silicon fertilizers are directly applied to soil, the dissolvability thereof is relatively poor and it is easy to be absorbed by soil colloids, which causes poor biological effectiveness. Thus, alleviating effect of silicon fertilizers to metal toxicity is less obvious in field application while compared with pot experiments. For example, though the silicon fertilizers applied to soil can also inhibit the absorption and accumulation of heavy metals such as Pb and Cr etc. in Chinese cabbages, its efficiency is limited; While 500 mg·kg$^{-1}$ of silicon oxide is applied to 100 mg·kg$^{-1}$ of cadmium polluted soil, there's only 16.9 percent of increase of the aboveground biomass of Chinese cabbages and 17.8 percent of decrease of the cadmium content in foliage, and the cost of this application per acre is more than 100 RMB. Silica sol has the characteristics of small partical size, large specific surface area, high dispersion, high adhesion, and is easily absorbed by plants. Our previous research proved that foliage fertilization had high utilization efficiency and high absorption, etc., and it is proved that silica sol sprayed onto the rice foliage can improve the resistance of rice to heavy metals and inhibit the transfer of the heavy metals such as Cd and Pb etc. from entering into grain kernels. However, no report was found about inhibiting the vegetables from absorbing and accumulating heavy metals by applying silicon fertilizers onto the foliage. According to our previous parent "Rare Earth Compound Silicon Sol Capable of Inhibiting Heavy Metal Absorption of Rice" (ZL200610036994.8), the compound silicon sol is specially developed for rice, and the foliage fertilization has a good result in inhibiting the rice from absorbing and accumulating the heavy metals; but most of the vegetables are dicotyledon, the silicon absorption and utilization thereof is greatly different from the rice which is the monocotyledon, so Technical scheme using silicon sol for inhibiting the vegetables from absorbing the heavy metals and its foliage fertilization technology thereof are greatly different from those of the rice. Currently, no special foliage fertilizer for inhibiting vegetables from absorbing the heavy metals has been found yet.

Most of the soil pollution is combined pollution. Besides of heavy metals, nitrides also are a common pollutant. Because of abusive use of chemical fertilizers, especially the over use of nitrogen fertilizers (urea and ammonium sulfate etc.), vegetables are seriously polluted by nitrides. Nitrides can be easily enriched in vegetables. Generally, levels of nitride accumulation in different vegetables ranked as follow: leaf vegetables>root vegetables>bulb vegetables>melon and fruits>beans>solanaceous fruit vegetables.

Leaf vegetables' nitride pollution problem are serious in some regions in China. For example, the nitride content of spinaches, Chinese Cabbages, plump white Chinese cabbages, Ipomoea aquatica, and Brassica parachinensis sampled in a market in Shenzhen are all more than 3,100 mg/kg, which means the vegetables are seriously polluted by nitrides. After nitrogen fertilizer or other nitride fertilizer is applied, the nitride will be enriched in the vegetables. Though the toxicity of nitrides is not high, but while nitrides entered human body it could convert into nitrites, which have high carcinogenicity to the human body. Once entering the blood, the nitrite can be combined with hemoglobin to generate hemoglobin, which makes the hemoglobin unable to be combined with or separated from oxygen, thus lose the capability of carrying oxygen. More seriously it can cause respiratory center paralysis, asphyxia and death. On the other hand, nitrite is the precursor of nitrosamine which is harmful to human for its carcinogenecity, teratogenecity and Mutagen, and further induces canceration of the digestion system.

With the rapid development of industry and agriculture and with the abusive use of pesticides and chemical fertilizers, the problem of heavy metal-nitride combined pollution of farm lands become more and more serious. To pursue high yields and stable yield of vegetables, a great amount of pesticides and chemical fertilizers were continuously used for years during vegetable cultivation and therefore causes a great amount of nitrides and heavy metals to accumulate in the soil. At present, Solutions to treating the heavy metal soil pollution mainly comprise engineering treatment, biological treatment, agricultural treatment and chemical treatment etc. The engineering treatment is mainly applied to seriously polluted soil, while biological methods are mainly applied to the lightly polluted soil; however, these methods usually need huge investment but with limited effect while applied in widely polluted soil treatment. In vegetable nitride control, the reduction of use of nitrogen fertilizer is a main means which leads to vegetable production decrease to a certain extent. Usually, farms pay more attention on yield when there is a conflict between yield and quality. Though accumulation of nitride in vegetables could be controlled by choosing vegetable types, adjusting the conditions of water, illumination and temperature etc. during the growth of the vegetables, but its effect is unsatisfactory. More over, among the vegetable pollution control measures, those for preventing and controlling heavy metal pollution and nitride pollution are separated. Solution to controlling the heavy metal and nitride combined pollution has not been found yet.

BRIEF SUMMARY OF THE INVENTION

One object of the invention is to provide a compound fertilizer capable of being used widely to inhibit and reduce the absorption and accumulation of heavy metals and nitride in vegetables to overcome the shortcomings in the prior art.

Another object of the invention aims to provide a preparation method of the fertilizer.

The abovementioned objects of the invention are fulfilled by the following solution:

A new soil preventive treatment idea is to reduce the absorption of the heavy metals and the nitride by improving the resistance of plants to the heavy metals and nitride, which is economical and safe. From this perspective, the fertilizer improves the resistance of crop to nitride poisoning by compounding silica sol by using the molybdenum element, to reduce the absorption and accumulation of the nitride in crop such as vegetables, and increases the resistance of the plant to heavy metals by using silica, and further strengthens the silica sol's heavy metal absorption inhibiting effect in crops by rare earth elements.

At first, the invention provides a compound foliage fertilizer capable of simultaneously inhibiting the vegetables from absorbing and accumulating heavy metals and nitrides. The compound foliage fertilizer is molybdenum-silica compound sol containing 10 to 25 mass percent of silica and 0.05 to 5.5 mass percent of molybdenum ions. The research of the invention proves that: by compounding the silica sol with the molybdenum element, the resistance of the crop to nitride poison can be improved greatly, and the effect of inhibiting heavy metal absorption is better at the same time.

For an optimizing option of the compound foliage fertilizer, a preferably compound foliage fertilizer is provided in this invention, namely rare earth-molybdenum-silica compound sol containing 10 to 25 mass percent of silica, 0.05 to 5.5 mass percent of molybdenum ions and 0.1 to 7.5 mass percent of rare earth ions. For further optimizing option, the fertilizer comprise 15 to 20 mass percent of silica, 0.1 to 1.5 percent of molybdenum ions and 0.5 to 2.5 mass percent of rare earth ions.

The invention makes an all new attempt to compound the silica sol with the rare earth element and the molybdenum element, so as to control the heavy metal and nitride combined pollution of vegetables, the vegetables are inhibited from absorbing the heavy metals and the nitride, and the inhibition ratio can be further increased at the same time.

Meanwhile, the invention provides a preparation method of the compound foliage fertilizer for reducing the heavy metal and nitride content of the vegetables, which has a great significance for obtaining the foliage fertilizer capable of effectively controlling the heavy metal/nitride content of the vegetables.

Generally speaking, the preparation method of the molybdenum-silica compound sol provided by the invention comprises the following steps of:

1. Preparing active silicic acid solution and alkaline solution that contains molybdenum ion, respectively;
2. Mixing the active silicic acid solution and alkaline solution that contains molybdenum ion prepared by step (1) at the temperature of 30 to 60° C., keeping the temperature and stirring for reaction to obtain molybdenum-silica compound sol;

Wherein said alkaline solution that contains molybdenum ion is alkaline metal molybdates solution (sodium molybdate and potassium molybdate for example), or ammonium molybdate solution; the optimal solution adopts the ammonium molybdate solution.

In a specific optimal solution, the preparation method of the molybdenum-silica compound sol comprises:

1. Preparation of Precursor Solution of the Compound Sol (Active Silicic Acid Solution, Rare Earth Salt Solution and Ammonium Molybdate Solution at Alkaline pH):

1.1 Preparation of Active Silicic Acid Solution

Solution containing 20 to 40 weight percent, preferably 25 to 30 weight percent, of $SiO_2$ is prepared from water glass serving as raw material; The prepared solution is acidized by hydrogenous strong-acid ion exchange resin; The solution is allowed to pass through a multi-stage resin exchange column at a certain speed, and the pH value of solution collected at the outlet of the column is controlled to be between 1 to 3, preferably between 1.5 to 2.5, to obtain the active silicic acid solution.

1.2 Preparation of Ammonium Molybdate Solution at Alkaline pH

Solution containing 0.1 to 10 weight percent, preferably 0.5 to 5 weight percent, of Mo is prepared from ammonium molybdate; the pH of the solution is adjusted to 9 to 13, preferably 10 to 12, by using an alkaline reagent; and the used alkaline reagent could be solution of sodium hydroxide, potassium hydroxide, aqueous ammonia etc. preferable choice is aqueous ammonia.

2. Preparation of Molybdenum-Silicon Compound Sol

The active silicic acid solution prepared by step 1.1 is stirred and heated to 30 to 60° C., preferably 35 to 45° C., with the presence of microwave (or in water bath). Tthe ammonium molybdate solution at alkaline pH prepared by step 1.3 is dropped into the said heated solution at a proper speed until the pH value is controlled to be between 7.5 and 8.5. After dropping, the temperature is still controlled to be the same level and the solution is continuously stirred for reaction for 2 to 3 h, and then stable and transparent molybdenum-silicon compound sol at alkalescent is obtained.

Generally speaking, the preparation method of the rare earth-molybdenum-silica compound sol provided as an optimizing option by the invention comprises the following steps of:

1. Preparing active silicic acid solution, rare earth salt solution and alkaline solution containing molybdenum ion, respectively;
2. Mixing the active silicic acid solution and the rare earth salt solution prepared by step 1 at the temperature of 30 to 60° C., and alkali is added into the mixture. During this process the temperature and stirring are controlled for reaction. Rare earth-silicon compound sol is then obtained.
3. Mixing the active silicic acid solution and the alkaline solution that contains molybdenum ion prepared by step 1 at the temperature of 30 to 60° C., keeping the temperature and stirring for reaction to obtain molybdenum-silicon compound sol;

4. Mixing the molybdenum-silicon compound sol obtained in step 1 and the rare earth-silicon compound sol obtained in step 3, stirring the mixed sol at the temperature of 30 to 90° C., performing dialysis and obtaining the rare earth-molybdenum-silica compound sol.

Wherein said alkaline molybdenum ion-containing solution is alkaline metal molybdates solution (sodium molybdate and potassium molybdate for example), or ammonium molybdate solution; and the preferable solution adopts the ammonium molybdate solution.

In the specific optimal scheme, the preparation method of rare earth-molybdenum-silica sol comprises:

1. Preparation of precursor solution of the compound sol (active silicic acid solution, rare earth salt solution and ammonium molybdate solution at alkaline pH):

1.1 Preparation of Active Silicic Acid Solution

Solution containing 20 to 40 weight percent, preferably 25 to 30 weight percent, of $SiO_2$ is prepared from water glass serving as raw material; The prepared solution is acidized by hydrogenous strong-acid ion exchange resin; The solution is allowed to pass through a multi-stage resin exchange column at a certain speed, and the pH value of solution collected at the outlet of the column is controlled to be between 1 to 3, preferably between 1.5 to 2.5, to obtain the active silicic acid solution.

1.2 Preparation of Ammonium Molybdate Solution at Alkaline pH

Solution containing 0.1 to 10 weight percent, preferably 0.5 to 5 weight percent, of Mo is prepared from ammonium molybdate; the pH of the solution is adjusted to 9 to 13, preferably 10 to 12, by using an alkaline reagent; and the used alkaline reagent could be solution of sodium hydroxide, potassium hydroxide, aqueous ammonia etc, preferably the aqueous ammonia.

1.3 Preparation of Rare Earth Salt Solution

Solution containing 0.5 to 15 weight percent, preferably 1.0 to 5.0 weight percent, of rare earth element is prepared by adding rare earth nitride serving as a raw material into purified water and the obtained mixture is continuously stirred until the rare earth nitride is completely dissolved, wherein the rare earth element could be lanthanum (La), cerium (Ce), neodymium (Nd) or europium (Eu) etc; and rare earth nitride may be one of them or mixture of more than one.

2. Preparation of Molybdenum-Silicon Compound Sol

The active silicic acid solution prepared by step 1.1 is stirred and heated to 30 to 60° C., preferably 35 to 45° C., with the presence of microwave (or in water bath), the ammonium molybdate solution at alkaline pH prepared by step 1.3 is dropped into the said heated solution at a proper speed until the pH value is controlled to be between 7.5 and 8.5. After dropping, the temperature is still be controlled to the same level and the solution is continuously stirred for reaction for 2 to 3 h, and then stable and transparent molybdenum-silicon compound sol at alkalescent is obtained.

3. Preparation of Molybdenum-Silicon Compound Sol

The solution of active silicic acid prepared by step 1.1 is stirred and heated to 30 to 60° C., preferably 35 to 45° C., with the presence of microwave (or in water bath), and the solution of rare earth prepared by step 1.2 is dropped into the heated solution at a proper speed, and a certain amount of alkaline reagent is added at the same time. The alkaline reagent could be potassium hydroxide, ammonia water or sodium hydroxide etc, preferably ammonia water. Dropping is stopped while the pH reached a value between 7.5 and 8.5. Then the temperature is still controlled to be the same level and the solution is continuously stirred for reaction for 2 to 3 h, and then stable and transparent rare earth-silicon compound sol at alkalescent pH is obtained.

4. Preparation of Molybdenum-Silica Compound Sol

Sol obtained in step 2 and step 3 is blended at a certain ratio, stirred and heated to 30 to 90° C., preferably 35 to 55° C., with the presence of microwave (or in water bath). After stirred for over 2 h, dialysis is carried out with a home-made dialyser and the rare-earth-molybdenum-silica compound sol with special structure and functions can be obtained.

$SiO_2$ concentration in the sol is controlled to be between 10 to 25 percent, preferably 15 to 20 percent; the molybdenum ion content is controlled to be between 0.05 and 5.5 percent, preferably 0.1 to 1.5 percent; and the rare earth ion content is controlled to be between 0.1 to 7.5 percent, preferably 0.5 to 2.5 percent. By said preparation method, the pH value of the obtained sol is about 7, which is within 6.5 to 8.

Compared with the prior art, the invention has the following advantages:

(1) In the invention, the silica sol is compounded with the molybdenum element, and this kind of sol can inhibit the vegetables from absorbing and accumulating nitride. It can be more widely used in the aspect of vegetable pollution control.

(2) In the invention, the silica sol is compounded with the rare earth element, and it's more functional on applying on vegetables; and the high specific surface area and strong absorption thereof considerably inhibit heavy metal from passing through membranes and entering plant cells, so the vegetable heavy metal poison is alleviated and the heavy metal absorption and accumulation in the vegetables are reduced, and the performance of preventing the heavy metal-nitride pollution of the rare-earth-molybdenum-silica compound sol is further strengthened.

(3) The rare-earth-molybdenum-silica compound sol prepared by the invention has a pH value of about 7, a grain size of 50 nm generally; the sol has high stability, high concentration, uniformity and transparency; and after the sol is settled for a long time or diluted in water, no flocculent precipitates are generated, and specific surface area does not decrease considerably.

(2) The rare-earth-molybdenum-silica compound sol prepared by the invention is neutral, has a few poisonous ions such as sodium ions, and can be directly sprayed on the vegetable surfaces after being diluted properly.

(5) The rare-earth-molybdenum-silica compound sol prepared by the invention can improve the resistance of the vegetables to heavy metal and nitride combined pollution, and comprehensively control the accumulated amount of the heavy metal and nitride in vegetables. Therefore it can help produce acceptable agricultural products.

(6) The preparation method provided by the invention can be carried out at a relatively low temperature and under normal pressure, conditions are mild, the process is simple, and the operation is convenient, so that the mass production is realized easily.

DETAILED DESCRIPTION OF THE INVENTION

Detailed embodiments are provided below to further describe the technical solution of the invention.

Embodiment 1

Figure 1:
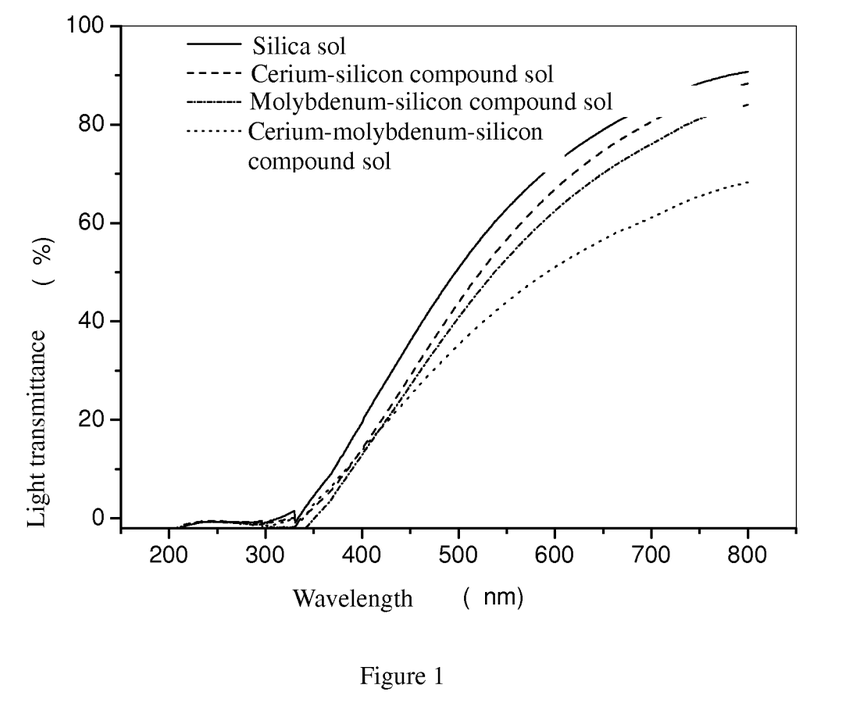
FIG. 1 illustrates a light transmittance spectrogram of the silica compound sol.
Figure 2:
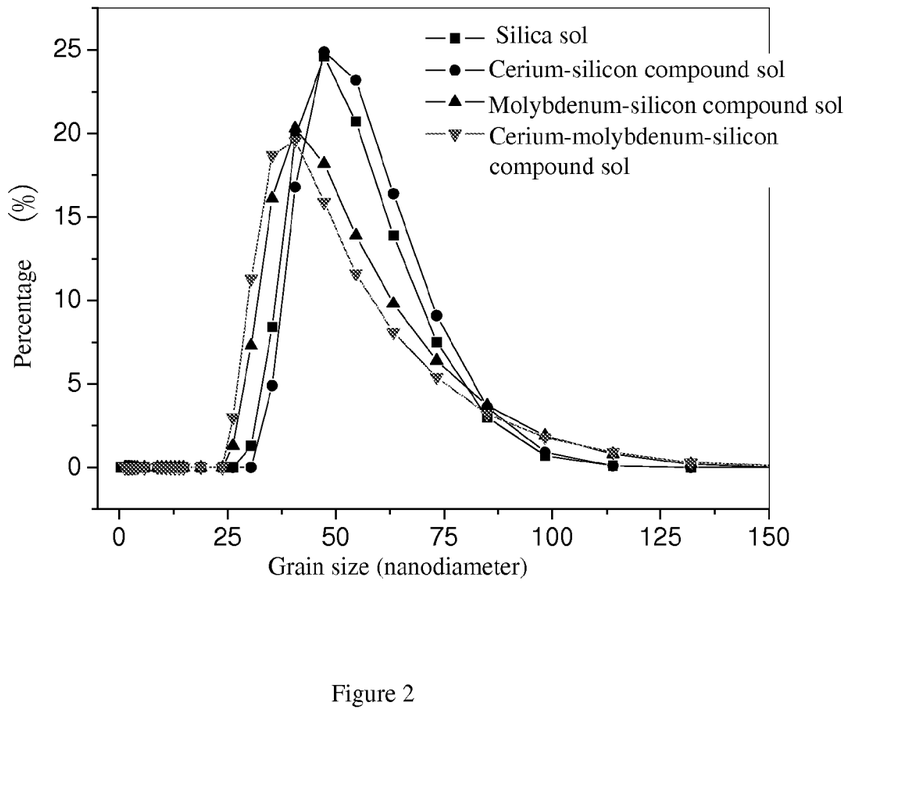
FIG. 2 illustrates a grain size distribution view of the silica compound sol.

Preparation of Cerium-Silicon Compound Sol 500 ml of sodium silicate solution with a concentration of 45 percent of sodium silicate is prepared by sodium silicate with a SiO2/Na2O mole ratio of 2, the obtained solution is magnetically stirred for 3 h at the temperature of 45° C. and then passes through 100 ml (wet volume) of hydrogenous strong-acid ion exchange resin at a constant speed, the pH value of solution collected at the outlet of the column is controlled to be 2 so as to obtain the active hydrated silica solution (A). 3.124 g of Ce(NO3)4 is weighed and added into 100 mL of purified water, and the mixed solution is continuously stirred until the Ce(NO3)4 is completely dissolved so as to obtain cerous nitrate solution (B). The solution (A) is heated to 45° C. with stirring in a water bath, and the solution (B) is dropped at a constant speed, and then 10 percent of ammonia water is added into the mixed solution until pH reach the value of 8.5. Then stop dropping. The resulting solution is continuously stirred to react for 3 h at the controlled temperature so as to obtain stable, transparent and alkalescent cerium-silicon compound sol (The light transmittance spectrogram thereof in shown in FIG. 1 and the grain size thereof is shown in FIG. 2).

Embodiment 2

Preparation of Molybdenum-Silicon Compound Sol

The preparation process of the active silicic acid (A) is the same as the embodiment 1; 10 percent of ammonium heptamolybdate solution is prepared, and several drops of strong ammonia water are added into the solution to adjust the pH of the solution to 11 so as to obtain ammonium molybdate solution at alkaline pH (B). The solution (A) is heated to 45° C. with stiffing in a water bath, and the solution (B) is dropped at a constant speed into it until the pH is 8.5, and the resulting solution is continuously stirred to react for 3 h at the controlled temperature so as to obtain stable, transparent and alkalescent molybdenum-silicon compound sol (The light transmittance spectrogram thereof is shown in FIG. 1 and the grain size thereof is shown in FIG. 2).

Embodiment 3

Preparation of Cerium-Molybdenum-Silicon Compound Sol

Sol prepared by the embodiment 1 and the embodiment 2 are mixed at a certain ratio, and the mixed sol is stirred for 3 h at the temperature of 45° C. in a water bath. The resulting sol is dialyzed by a home-made dialyzer so as to obtain the cerium-molybdenum-silicon compound sol with pH of about 7 and with a special structure and special functions (The light transmittance spectrogram thereof is shown in FIG. 1 and the grain size thereof is shown in FIG. 2).

Embodiment 4

Effect of Relieving Leaf Mustard Arsenic Poison by Spraying Cerium-Silicon Compound Sol on Foliage Neutral soil for test, with an arsenic content of 174 mg·kg-1, is sampled from an arsenic polluted vegetable farm in a tungsten ore area of Lianhua Mountain, Yanhong Town, Chenghai District, Shantou, Guangdong. Lettuces are planted in pots of which each has 1.5 kilograms of soil by direct seedling, and after 30 days, the foliage spraying cerium-silicon compound sol treatment is carried out. There are 10 treatments in total: singularly spraying silica solution (silica sol is prepared from the method in the parent (ZL200610036994.8), wherein the concentration is 2 mmol·L$^{-1}$, 5 mmol·L$^{-1}$ and 10 mmol·L$^{-1}$ (marked as 2Si, 5Si and 10Si) respectively; singularly spraying cerous nitrate with the concentration of 2 mmol·L$^{-1}$, marked as 2Ce; spraying 5 mmol·L$^{-1}$ of cerium-silicon sol, wherein the compound quantities of cerium is 1%, 2%, 10%, 20% and 25% marked as 1% Ce—Si, 2% Ce—Si, 10% Ce—Si, 20% Ce—Si and 25% Ce—Si, respectively. (the percentage here means the percentage of cerium atoms to silicon atoms). About 200 ml of sol is uniformly sprayed onto plant foliage of each pot by a sprayer until liquid drops form the leaves; equivalent amount of de-ionized water is sprayed to the control treatment (CK). Each treatment is triplicate. The aboveground parts of vegetables which have grown for 2 months (the growth period thereof is 58 days) are harvested 7 days after the sol is sprayed, and the fresh weight dry weight, chlorophyll content and arsenic content of the aboveground part are determined.

Figure 3:
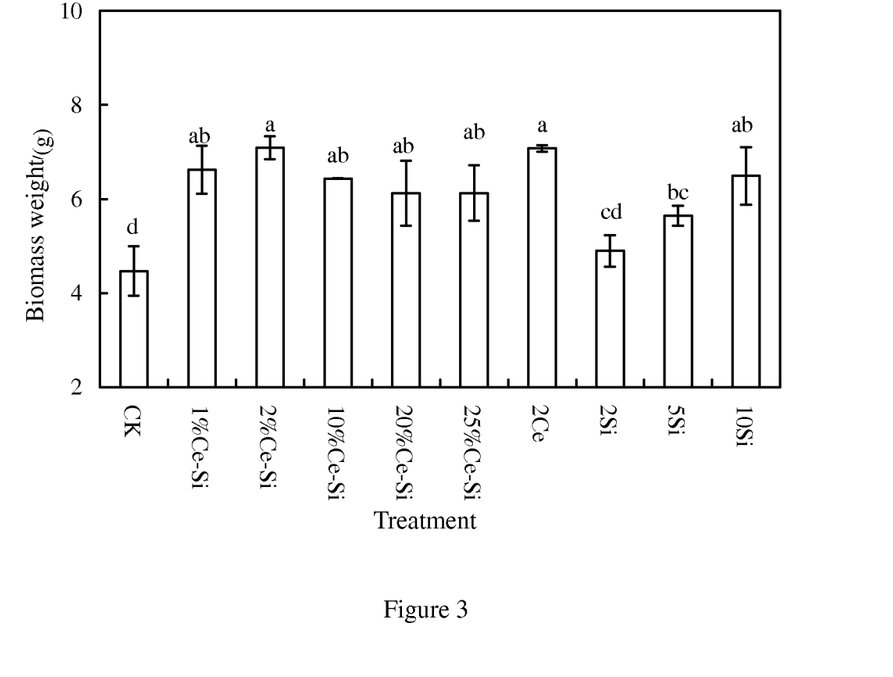
FIG. 3 illustrates the influences of different cerium-silicon compound sol treatment on the biomass fresh weight of the aboveground parts of lettuce, in which n=3; CK represents a control group which is sprayed with de-ionized water; the percentage means the percentage of cerium atoms to silicon atoms; the error bar is a standard error bar; and the identical letters mean there is no obvious difference.
Figure 4:
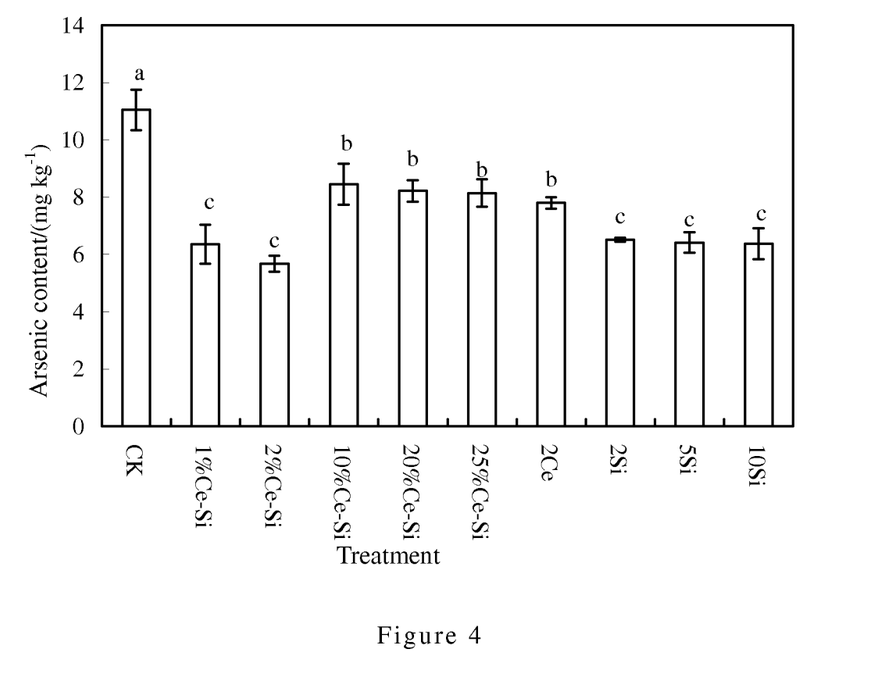
FIG. 4 illustrates the influences of different cerium-silicon compound sol treatment on arsenic content of the aboveground parts of the lettuce, in which n=3; CK represents a control group sprayed with de-ionized water; percentage means the percentage of cerium atoms to silicon atoms; the error bar is a standard error bar, and the identical letters mean there is no obvious difference.

The results demonstrate that: the lettuce arsenic poison can be alleviated by spraying both silicon sol of different concentration and cerium-silicon compound sol of different compounding ratio on foliage. After the sol is sprayed, the foliage of the lettuces obviously becomes thick, large and glossy; and the effect of alleviating the lettuce arsenic poison can be further improved by spraying the silicon sol compounded with a small amount of cerium onto the foliage. The growth of the lettuces can be obviously enhanced by spraying the cerium-silicon compound sol onto the foliage so as to improve the biomass weight of the aboveground parts (FIG. 3). The biomass weight of the aboveground parts of the lettuces treated by 2% Ce—Si is the highest, with the dry weight of a single strain of 7.1 g. This is 1.6 times of that of the control treatment (CK). The biomass weight of the aboveground parts of the lettuces of which the foliage is sprayed with the cerium-silicon compound sol is higher than that sprayed with silica sol; and the biomass weights of the aboveground leaf mustards treated by 5Si, 1% Ce—Si, 10% Ce—Si, 20% Ce—Si and 25% Ce—Si, are increased by 26.4%, 48.4%, 44.1%, 37.1% and 37.2% respectively than the control treatment. The As content of the aboveground parts of the lettuces can be obviously reduced by 23.5% to 48.6% by spraying various cerium oxide-silicon oxide compound sol on the foliage (as shown in FIG. 4). As content of the aboveground parts of the lettuces treated by 2 percent of Ce—Si is the lowest with the value of 5.68 mg·kg$^{-1}$, which is 48.6% of that of the control treatment.

Embodiment 5

Effect of Relieving Vegetable Nitride Poison by Spraying Molybdenum-Silicon Compound Sol on Foliage The test is carried out at the Zengcheng farmland in Guangdong Province in China, which is a vegetable production base requiring a great amount of nitrogen fertilizers. Vegetables for tested include Chinese cabbages, Brassica parachinensis, leaf mustards and lettuces. Molybdenum-silicon compound sol is sprayed on different treatments on foliage after 20 days of vegetables planting. Treatments are as follows: singularly spraying 5 mmol·L$^{-1}$ of silica sol (the silicon sol is prepared by the method provided by the patent (ZL200610036994.8)) marked as 5Si; singularly spraying 5 mmol·L$^{-1}$ of ammonium molybdate solution marked as 5Mo; spraying 5 mmol·L$^{-1}$ of molybdenum-silicon compound sol, wherein the compound amount of molybdenum is 0.5%, 1.0%, 2.0%, 2.5% and 5%, marked as 0.5% Mo—Si, 1.0% Mo—Si, 2.0% Mo—Si, 2.5% Mo—Si and 5% Mo—Si (percentage hereby means the percentage of molybdenum atoms to silicon atoms). The sol is sprayed twice, more specifically that is once in the morning and once in the evening, respectively. Every spraying is finished when water drops of water appear on the foliage but have not fall down yet. The control group (CK) is sprayed with clean water, while other field management measures are identical with the regular management. The nitride content of the aboveground part is determined after harvest. The area of the region is 20 m$^2$, the spraying is carried out triplicate and regional groups are arrayed at random.

The result demonstrated that: the nitride content of the aboveground parts of the Chinese cabbages, Brassica parachinensis, leaf mustards and lettuces can be obviously reduced by spraying silicon sol, ammonium molybdate and molybdenum-silicon compound sol on the foliage, wherein the treatment with Mo—Si compound sol which had reduced the nitride content of the aboveground parts of the vegetables for 13.3% to 62.3%, is more effective than the one with 5 mmol·L$^{-1}$ of silica sol singularly on inhibiting nitride absorption on the vegetables. While the nitride content of the aboveground with treatment with the >1% Mo—Si compound sol is obviously lower than of with 5 mmol·L$^{-1}$ of ammonium molybdate solution singularly. Among all treatment, while treated with 2.5 percent of Mo—Si compound sol, the nitride content of the aboveground parts of the vegetables is the lowest, that is 1221, 1247, 986 and 870 mg·kg$^{-1}$, respectively, on the aboveground parts of the Chinese cabbages, Brassica parachinensis, leaf mustards and lettuces, which reduced by 67.7 percent, 60.1 percent, 46.6 percent and 38.7 percent respectively than the control treatment, all of which were qualified for the third-level standard (less than 1440 mg·kg-1) of vegetable nitride content sanitary standards, and can be eaten after being cooked.

TABLE 1

Influence of different sol sprayed on foliage on nitride content of vegetables

| Treatment | Chinese Cabbage Nitride Content (mg · kg$^{-1}$) | Inhibition Ratio (%) | Brassica parachinensis Nitride Content (mg · kg$^{-1}$) | Inhibition Ratio (%) | Leaf Mustard Nitride Content (mg · kg$^{-1}$) | Inhibition Ratio (%) | Lettuce Nitride Content (mg · kg$^{-1}$) | Inhibition Ratio (%) |
|---|---|---|---|---|---|---|---|---|
| CK | 3714 | | 3124 | | 1847 | | 1420 | |
| 0.5%Mo—Si | 3147 | 15.3 | 2673 | 14.4 | 1529 | 17.2 | 1225 | 13.3 |
| 1%Mo—Si | 2987 | 19.6 | 2214 | 29.1 | 1241 | 32.8 | 1139 | 19.8 |
| 2%Mo—Si | 1734 | 53.3 | 1578 | 49.5 | 1107 | 40.1 | 973 | 31.5 |
| 2.5%Mo—Si | 1221 | 67.1 | 1247 | 60.1 | 986 | 46.6 | 870 | 38.7 |
| 5%Mo—Si | 1401 | 62.3 | 1379 | 55.9 | 1129 | 38.9 | 894 | 37.0 |
| 5Mo | 3142 | 15.4 | 2473 | 20.8 | 1413 | 23.5 | 1276 | 10.1 |
| 5Si | 3345 | 9.9 | 2771 | 11.3 | 1547 | 16.2 | 1236 | 13.0 |

Embodiment 6

Effect of Alleviation of Heavy Metal and Nitride Combined Pollution of Brassica Parachinensis by Spraying Cerium-Molybdenum-Silicon Compound Sol The test is carried out at Dongsheng farm at Panyu, Guangzhou, Guangdong province, China, which is a vegetable production base and of which the soil is slightly polluted by Cd. content of Cd is 0.872 mg·kg$^{-1}$. The vegetables for test are Brassica parachinensis. Cerium-molybdenum-silicon compound sol spraying treatment on foliage is carried out after 20 days of plating as follows: spraying silica sol singularly, (silica sol is prepared by the method provided by the patent (ZL200610036994.8)), marked as Si; spraying molybdenum-silicon compound sol with a molybdenum amount of 2.5%, marked as Mo—Si; spraying cerium-silicon compound sol with a cerium content of 2%, marked as Ce—Si; spraying the cerium-molybdenum-silicon compound sol with a cerium content of 2.0% and a molybdenum content of 2.5%, marked as Ce—Mo—Si. sols were sprayed twice, once in the morning and once in the evening respectively. Every spraying is finished when water drops appear on the foliage but do not fall down. The control treatment (CK) is sprayed with clean water, and other field management measures are identical with the regular management. The nitride content of the aboveground part is determined after harvest. The area of the region is 20 m2, the spraying is carried out triplicate and regional groups are arrayed at random.

The result demonstrated that: the growth of the vegetables can be promoted by spraying various sol. Compared with control group, the yield per acre of the vegetables with treatments increased by 10.8 to 26.8 percent. The Cd content of the aboveground parts of the Brassica parachinensis treated with various sol is obviously reduced by 52.9% to 60.0%. The nitride content of the aboveground parts of the Brassica parachinensis treated with various sol can also be obviously reduced by 12.2% to 66.5%. Within these treatment, spraying with Ce—Si sol is more effective on inhibiting heavy metal Cd absorption in Brassica parachinensis Brassica parachinensis than spraying with the silica sol singularly; while spraying with Mo—Si sol is more effective on inhibiting nitride accumulation in Brassica parachinensis than spraying with the silica sol singularly; besides, spraying with Ce—Mo—Si compound sol in the most effective on controlling and preventing the heavy metal and nitride pollution. Compared with the control group, when the Brassica parachinensis is sprayed with the Ce—Mo—Si compound sol, the average yield per Acre is increased by 26.8%, the heavy metal content of the aboveground part is reduced by 65.2%, and the nitride content is reduced by 66.5%. Both the Cd content and the nitride content of the aboveground parts of the Brassica parachinensis are qualified for the food hygienic standard.

TABLE 2

Effect of alleviating heavy metal and nitride combined pollution of *Brassica parachinensis* by spraying different sol on foliage

| | Average Yield per Acre Kilogram | Yield Increase Rate (%) | Cadmium Content of Aboveground Part (mg · kg$^{-1}$) | Inhibition Ratio (%) | Nitrate Content of Aboveground Part (mg · kg$^{-1}$) | Inhibition Ratio (%) |
|---|---|---|---|---|---|---|
| CK | 1125 | | 0.223 | | 2812 | |
| Ce—Si | 1316 | 16.9 | 0.089 | 60.0 | 2214 | 21.2 |
| Mo—Si | 1247 | 10.8 | 0.105 | 52.9 | 1173 | 58.2 |
| Ce—Mo—Si | 1427 | 26.8 | 0.078 | 65.2 | 942 | 66.5 |
| Si | 1286 | 14.3 | 0.096 | 56.9 | 2467 | 12.2 |

The invention claimed is:

1. A method for preparing a compound foliage fertilizer comprising:
    (1) Preparing an active silicic acid solution, and a molybdenum ion-containing solution at alkaline pH, respectively,
    wherein the molybdenum ion-containing solution at alkaline pH is an alkaline metal molybdates solution, or ammonium molybdate solution, and
    wherein the mass percent of silica in the active silicic acid solution is 20% to 40%, and the mass percent of molybdenum ions in the ammonium molybdate solution at alkaline pH is 0.1% to 10%;
    (2) Mixing the active silicic acid solution and the molybdenum ion-containing solution at alkaline pH prepared by step (1) at a temperature of 30° C. to 60° C., while maintaining the temperature and stirring to allow a reaction to occur, to obtain the compound foliage fertilizer,
    wherein the compound foliage fertilizer is a molybdenum-silicon compound sol containing 10 to 25 mass percent of silica and 0.05 to 5.5 mass percent of molybdenum ions, and
    wherein the compound foliage fertilizer is used to reduce heavy metal and nitrate content of vegetables.

2. The method of claim 1, wherein in step (1), the pH value of said active silicic acid solution is 1 to 3; and the pH value of said ammonium molybdate solution at alkaline pH is 9 to 13.

3. A method for preparing a compound foliage fertilizer comprising:
    (1) Preparing an active silicic acid solution, rare earth salt solution and an molybdenum ion-containing solution at alkaline pH, respectively,
    wherein the molybdenum ion-containing solution at alkaline pH is alkaline metal molybdates solution or ammonium molybdate solution;
    (2) Mixing the active silicic acid solution and the molybdenum ion-containing solution at alkaline pH prepared by step (1) at a temperature of 30° C. to 60° C., while maintaining the temperature and stirring to allow a first reaction to occur, to obtain a molybdenum-silicon compound sol;
    (3) Mixing the active silicic acid solution and the rare earth salt solution prepared by step (1) at a temperature of 30° C. to 60° C., adding an alkaline compound, and maintaining the temperature and stirring to allow a second reaction to occur, to obtain a rare earth-silicon compound sol;
    (4) Mixing the molybdenum-silicon compound sol obtained in step (2) and the rare earth-silicon compound sol obtained in step (3), stirring the mixed sol at 30° C. to 90° C., and performing dialysis, to obtain the compound foliage fertilizer,
    wherein the compound foliage fertilizer is a rare earth-molybdenum-silica compound sol containing 10 to 25 mass percent of silica, 0.05 to 5.5 mass percent of molybdenum ions and 0.1 to 7.5 mass percent of rare earth ions, and
    wherein the compound foliage fertilizer is used to reduce heavy metal and nitrate content of vegetables.

4. The method of claim 3, wherein in step (1) the mass percent of silica in said active silicic acid solution is 20% to 40%; the mass percent of molybdenum ions in the ammonium molybdate solution is 0.1% to 10%; and the mass percent of the rare earth element in the rare earth salt solution is 0.5% to 15%.

5. The method of claim 4, wherein in step (1) the pH value of said active silicic acid solution is 1 to 3; the pH value of said ammonium molybdate solution at alkaline pH is 9 to 13; and the rare earth salt is one selected from the group consisting of cerium nitride, lanthanum nitride, neodymium nitride, europium nitride, and mixtures thereof.

6. The method of claim 5, wherein the pH values of the molybdenum-silicon compound sol prepared in step (2) and the rare earth-silicon compound sol prepared in step (3) are both between 7.5 to 8.5; the time of stirring in the first reaction in step (2) and the second reaction in step (3) is 2 h to 3 h; and the time for stirring in step (4) is more than 2 h.

* * * * *